(12) United States Patent
Phuyal et al.

(10) Patent No.: US 11,956,689 B2
(45) Date of Patent: Apr. 9, 2024

(54) SIGNALLING ENHANCEMENTS FOR AERIAL OPERATION

(71) Applicant: QUALCOMM Incorporated, San Diego, CA (US)

(72) Inventors: Umesh Phuyal, San Diego, CA (US); Luis Fernando Brisson Lopes, Swindon (GB); Le Liu, Fremont, CA (US); Alberto Rico Alvarino, San Diego, CA (US); Chiranjib Saha, Blacksburg, VA (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 17/303,463

(22) Filed: May 28, 2021

(65) Prior Publication Data

US 2022/0386208 A1 Dec. 1, 2022

(51) Int. Cl.
| | |
|---|---|
| *H04W 4/00* | (2018.01) |
| *B64C 39/02* | (2023.01) |
| *G08G 5/00* | (2006.01) |
| *H04B 7/185* | (2006.01) |
| *H04W 36/32* | (2009.01) |
| *B64U 10/13* | (2023.01) |

(52) U.S. Cl.
CPC .......... *H04W 36/32* (2013.01); *B64C 39/024* (2013.01); *G08G 5/0013* (2013.01); *G08G 5/0069* (2013.01); *H04B 7/18506* (2013.01); *B64U 10/13* (2023.01); *B64U 2201/20* (2023.01)

(58) Field of Classification Search
CPC ..... H04W 36/32; H04W 88/02; H04W 36/16; B64C 39/024; G08G 5/0013; G08G 5/0069; H04B 7/18506; B64U 10/13; B64U 2201/20

USPC ......................................................... 370/331
See application file for complete search history.

(56) References Cited

U.S. PATENT DOCUMENTS

| | | | |
|---|---|---|---|
| 9,467,922 B1* | 10/2016 | Buchmueller | ........ B64C 39/024 |
| 9,998,975 B1* | 6/2018 | Buchmueller | ..... H04B 7/18506 |
| 10,558,208 B2* | 2/2020 | Xue | ...................... G08G 5/0039 |
| 10,772,018 B2* | 9/2020 | Yeh | ......................... H04L 43/16 |
| 11,475,390 B2* | 10/2022 | Torii | .................. G06Q 10/0832 |
| 11,475,777 B2* | 10/2022 | Wang | ................... H04W 4/029 |
| 2018/0017973 A1* | 1/2018 | Teague | .................. H04W 24/08 |
| 2019/0108760 A1* | 4/2019 | Krishna | .................... G01C 5/06 |

(Continued)

FOREIGN PATENT DOCUMENTS

| | | |
|---|---|---|
| EP | 3764685 A1 | 1/2021 |
| EP | 3809730 A1 | 4/2021 |

OTHER PUBLICATIONS

International Search Report and Written Opinion—PCT/US2022/026838—ISA/EPO—dated Aug. 3, 2022.

(Continued)

*Primary Examiner* — Amancio Gonzalez
(74) *Attorney, Agent, or Firm* — Haynes and Boone, LLP

(57) ABSTRACT

Wireless communications systems and methods related to communications in a wireless network during handover are provided. A method of wireless communication performed by a first base station (BS), may include communicating, based on a handover condition, flight path information associated with an unmanned aerial vehicle (UAV) and performing a communication handover of the UAV between the first BS and a second BS.

30 Claims, 10 Drawing Sheets

(56) References Cited

U.S. PATENT DOCUMENTS

| | | | |
|---|---|---|---|
| 2020/0058224 A1* | 2/2020 | Giona | G08G 5/0034 |
| 2020/0258397 A1 | 8/2020 | Hong | |
| 2020/0344661 A1 | 10/2020 | Hong | |
| 2021/0074167 A1* | 3/2021 | Hong | H04W 4/44 |
| 2021/0256855 A1* | 8/2021 | Hong | H04W 36/0016 |
| 2021/0295711 A1* | 9/2021 | Hong | G08G 5/0034 |
| 2021/0343152 A1* | 11/2021 | Faccin | G08G 5/0069 |
| 2022/0069876 A1* | 3/2022 | Xue | H04B 7/0617 |
| 2022/0286936 A1* | 9/2022 | Futaki | H04W 36/08 |

OTHER PUBLICATIONS

Nokia., et al., "Text Proposal to 36.331: Flight Path Information", 3GPP TSG-RAN WG2 Meeting #102, R2-1807886, 3rd Generation Partnership Project (3GPP), Mobile Competence Centre, 650, Route Des Lucioles, F-06921 Sophia-Antipolis Cedex, France, vol. RAN WG2, No. Busan, South Korea, May 21, 2018-May 25, 2018, May 20, 2018 (May 20, 2018), XP051444218, 12 Pages.

* cited by examiner

SIGNALLING ENHANCEMENTS FOR AERIAL OPERATION

TECHNICAL FIELD

This application relates to wireless communication systems, and more particularly to communications in a wireless network during handover of an unmanned aerial vehicle (UAV) and/or other user equipment (UE) between base stations.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

Mobility support is important in a wireless communication network, where a UE may travel from one coverage area or cell to another coverage area or cell. For example, a BS may serve a UE in a coverage area of the BS. The UE may report channel measurements. When the BS detects a degradation in channel quality based on the reported channel measurements and/or other channel information, the BS may initiate a handover of UE to another BS that can provide the UE with a better channel quality.

In some wireless communications systems, the UEs may include unmanned aerial vehicles (UAV) which may be devices capable of flying through the air. In such systems, it may be appropriate for the aerial UEs to communicate flight path information with a wireless network to facilitate handover operation. Accordingly, improvements to mobility support are desirable for UAVs.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a first base station (BS) includes communicating, based on a handover condition, flight path information associated with an unmanned aerial vehicle (UAV) and performing a communication handover of the UAV between the first BS and a second BS.

In an additional aspect of the disclosure, a method of communication performed by a network unit includes receiving an indication of a handover of an unmanned aerial vehicle (UAV) from a first base station (BS) to a second BS and transmitting, to the second BS based on the indication of the handover of the UAV, flight path information associated with the UAV.

In an additional aspect of the disclosure, a first base station (BS) includes a transceiver, a memory, and a processor coupled to the transceiver and the memory, the base station configured to communicate, based on a handover condition, flight path information associated with an unmanned aerial vehicle (UAV) and perform a communication handover of the UAV between the first BS and a second BS.

In an additional aspect of the disclosure, a network unit includes a transceiver, a memory, and a processor coupled to the transceiver and the memory, the network unit configured to receive an indication of a handover of an unmanned aerial vehicle (UAV) from a first base station (BS) to a second BS and transmit, to the second BS based on the indication of the handover of the UAV, flight path information associated with the UAV.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

DETAILED DESCRIPTION

Figure 1:
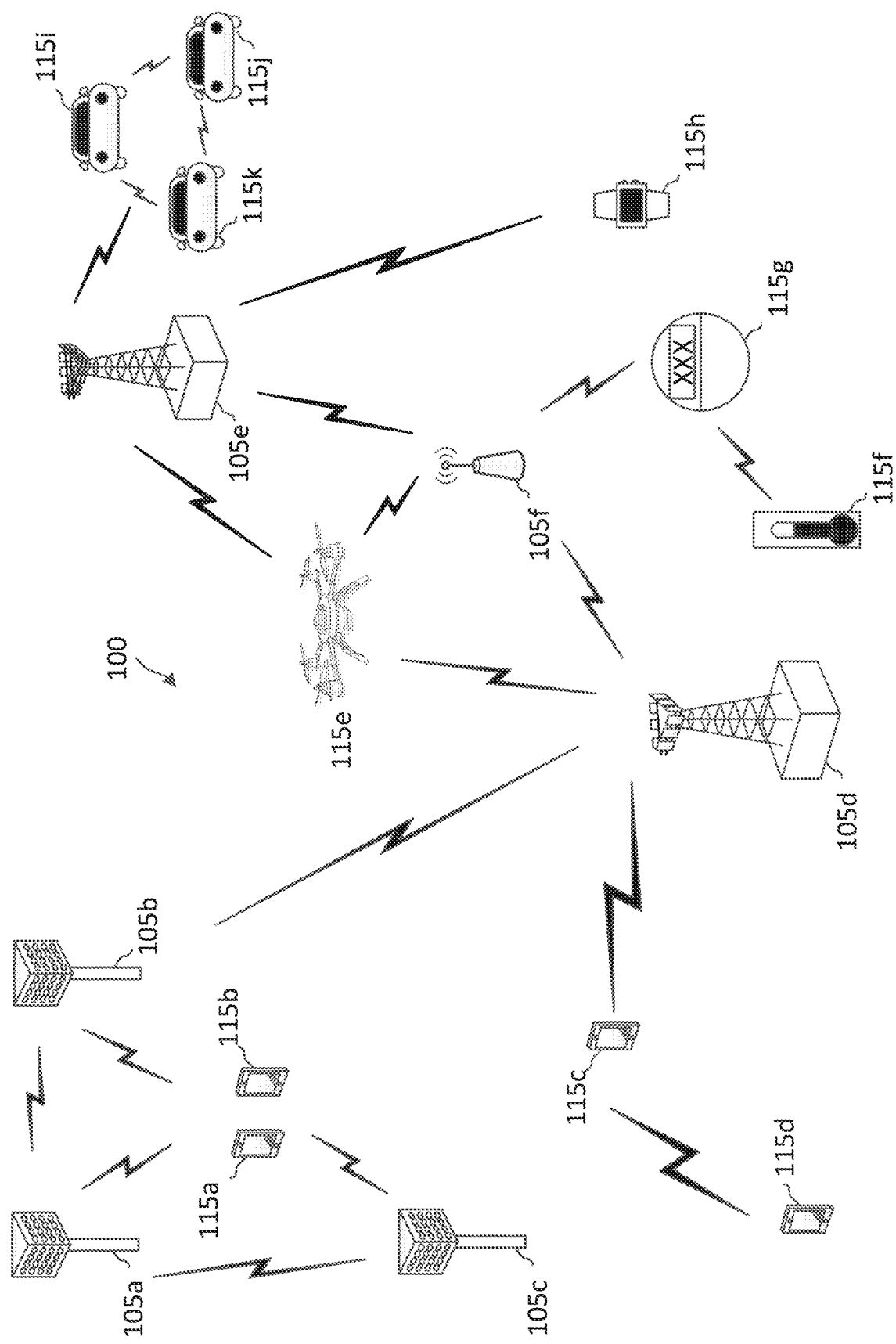
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for wireless network devices to communicate flight path information in support of UE handover methods. The disclosed approaches include various methods of communicating the flight path information between UEs, BSs, and network nodes. The disclosed approaches further include various methods of communicating the status of the flight path information and updating the flight path information.

In some aspects, a UE may travel a flight path within the wireless coverage areas of multiple BSs. Handover of the UE between BSs as the UE travels the flight path may enable to UE to maintain wireless connectivity when the UE is in communication range of the BSs. In accordance with the present disclosure, communicating the flight path information (e.g., waypoints, ETAs, speed of travel, etc.) to the target handover BSs may facilitate proactive optimization of the handover methods, including, without limitation, more efficient use of network resources, maintaining connectivity of the UE to the network, and reducing power usage of the UE and/or BSs. In some aspects, the UE may travel between BS coverage areas such that the flight path information may include waypoints that have already been traveled by the UE. In some instances, by communicating partial flight path information to the target BS that includes waypoints to be traveled by the UE and excludes historic flight path information in accordance with the present disclosure, the amount of data included in the flight path information may be reduced, which can improve network performance. In this regard, communicating a reduced amount of flight path information data may reduce the data load on the wireless network, reduce the latency associated with communicating the flight path information, and reduce power usage of the UE and/or BSs.

In some aspects, the flight path associated with the UE may be updated based on one or more events or conditions. In turn, the flight path information may be updated. In some aspects of the present disclosure, the target BS may receive an indication that updated flight information is available. The target BS may request the updated flight path information or otherwise receive the updated flight path information (directly or indirectly) from the UE. Communicating the updated flight path information to the target BS may facilitate proactive optimization of the handover of the UE between BSs, which can lead to more efficient use of network resources, maintaining connectivity of the UE to the network, and reducing power usage of the UE and/or BSs.

In some aspects, a method of wireless communication performed by a target base station (BS) may include communicating, based on a handover condition, flight path information associated with an unmanned aerial vehicle (UAV), and performing a communication handover of the UAV between the target BS and a source BS.

In some aspects, a method of communication performed by a network unit may include receiving an indication of a handover of an unmanned aerial vehicle (UAV) from a target base station (BS) to a source BS, and transmitting, to the source BS based on the indication of the handover of the UAV, flight path information associated with the UAV.

FIG. 1 illustrates a wireless communication network 100 according to some aspects of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE)

devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be an unmanned aerial vehicle (UAV). In some aspects, the UE 115e may be the UE 115 as described with reference to FIGS. 2-6 and 9-10. The UE 115e may be a UAV or uncrewed aerial vehicle, or may be commonly referred to as a drone. The UE 115e may be an aircraft (plane, helicopter, drone, glider, etc.) with or without a human pilot having varying degrees of autonomy. In some instances, the UE 115e may be associated with a ground-based controller or other remote controller that communicates with the UE 115e using network 100. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

While the UE 115 is connected to the BS 105, the UE may switch to another BS 105 due to degradation in the received signal power from the serving BS 105. The degradation can occur when the UE 115 travels out of a coverage area of the serving BS 105. The process of a connected UE 115 changing its association from one BS 105 (e.g., a source BS) to another BS (e.g., a target BS) 105 is referred to as handover. In some instances, the UE 115 may be a UAV. The UAV may have flight path information associated with the UAV that defines waypoints and/or expected time of arrival (ETA) (commonly known also as timestamp) of the UAV at those waypoints. The network 100 may support methods of communicating the flight path information to a target BS 105 to facilitate handover to the target BS 105. Mechanisms for communicating the flight path information are described in greater detail herein.

Figure 2:
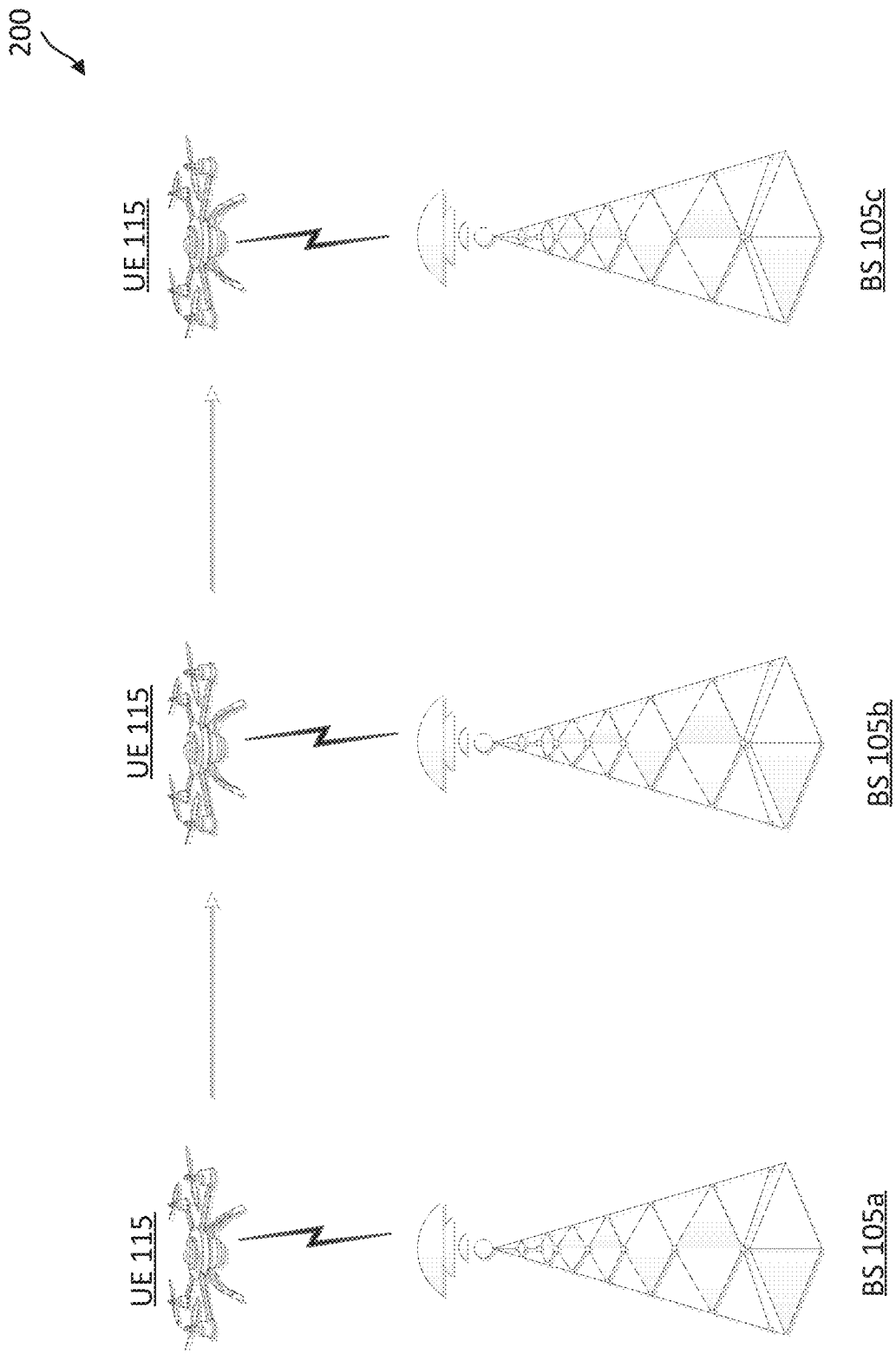
FIG. 2 illustrates handover conditions associated with a UE according to aspects of the present disclosure.

FIG. 2 illustrates handover conditions associated with a UE 115 (e.g., a UAV) in a network 200 according to aspects of the present disclosure. FIG. 2 illustrates a wireless communication network 200 supporting communication of UE flight path information according to aspects of the present disclosure. The network 200 may correspond to a portion of the network 100. The network 200 includes a UE 115, a BS 105a, a BS 105b, and a BS 105c. The UE 115 may correspond to the UE 115 in the network 100. The BSs 105a, 105b and 105c may correspond to BSs 105 in the network 100.

The UE 115 may include a UAV that travels along a flight path (e.g., a predetermined flight path, a revised flight path, an ad-hoc flight path, combinations thereof, or other flight paths). The flight path may include one or more waypoints within a communication range of BS 105a. Additionally or optionally, the flight path may include one or more waypoints within a communication range of BS 105b, BS 105c and so on. While in communication range of BS 105a, the UE 115 may be connected (e.g., RRC connected state) to BS 105a. As the UE 115 travels along its flight path away from BS 105a and towards BS 105b, a handover condition may occur. The handover condition may require a handover of the UE 115 from BS 105a to BS 105b. For example, the UE 115 may perform and report channel measurements. The UE 115 may transmit the measurement reports to the BS 105a. The measurement report may include measurements about the quality of the channel between the UE 115 and the BS 105a and/or measurements about the quality of the channel between the UE 115 and the BS 105b (or other BSs). The measurements may include a reference signal received power (RSRP), a reference signal received quality (RSRQ), a received signal strength indicator (RSSI), and/or a signal-to-interference-noise-ratio (SINR). As the UE 115 travels on a flight path away from the BS 105a the measurement report may indicate that the signal quality from the BS 105a to the UE 115 is low. As part of the handover preparation, the BS 105a (e.g., the source BS) may request the BS 105b (e.g., the target BS) to prepare for the handover. The source BS 105a may communicate the UE's radio resource control (RRC) context information and/or flight path information to the BS 105b. The BS 105b may prepare for the handover by reserving resources for the UE 115. After reserving the resources, the target BS 105b may transmit an acknowledgement to the source BS 105a in response to the handover request. The flight path information may be received by the target BS 105b using the methods and techniques described herein. For example, the flight path information may be received by the target BS 105b from the UE 115, the BS 105a, a core network unit, or other component of the wireless communication network. In some aspects, the BS 105a and/or the BS 105b may be connected to EPC. In some aspects, the BS 105a and/or BS 105b may be connected to 5GC. As such, in some aspects, the UE 115 may transmit the flight path information when it is connected to 5GC. The UE 115 may transmit the flight path information to the target BS 105b over any interface using any messaging format. For example, the UE 115 may transmit the flight path information to the target BS 105b over a Uu interface and/or a sidelink interface. The UE 115 may transmit the flight path information to the target BS 105b using a unicast message, a multicast message, or a broadcast message. The multicast message and/or the broadcast message may be transmitted in a sidelink communication mode. The UE 115 may transmit the flight path information to the target BS 105b over a physical uplink shared channel (PUSCH) or a physical uplink control channel (PUCCH). In some aspects the UE may transmit a flightPathInfoAvailable indication to the target BS 105b indicating flight path information is available. In some aspects, the UE 115 may transmit the flightPathInfoAvailable indication when it is connected to 5GC.

In some aspects, the UE may indicate to the network, e.g. using UE radio capability signaling, whether it is capable of providing flight path information when connected to 5GC. In response, the target BS 105b may transmit a flightPathInfoReq message to the UE in a UEInformationRequest message. In response, the UE may send the flight path information using RRC signaling in a flightPathInfoReport. In some instances, the target BS 105b may receive the flight path information from the source BS 105a. For example, the target BS 105b may receive the flight path information from the source BS 105a over an X2 interface and/or an Xn interface. The X2 or the Xn interface may include an Ethernet interface, a fiber optic interface, a microwave interface, or a combination thereof. The target BS 105b may receive the flight path information from the source BS 105a in a handover request message. For example, the target BS 105b may receive the flight path information from the source BS 105a in an X2 application protocol (X2-AP) handover request message. In some instances, the handover request message sent by the source BS 105a to the target BS 105b may include the flight path information. The target BS 105b may receive the flight path information from a network unit as will be described in detail with reference to FIG. 3. The network unit may include a core network computing device(s) that is configured to communicate the flight path information to the target BS 105b. The network unit may include computing, storage and/or communication nodes such as a mobility management entity (MME) and/or an access and mobility management function (AMF) node that are configured to communicate the flight path information. The target BS 105b may receive the flight path information and other handover related information from the MME and/or the AMF over the S1 interface. The target BS 105b may receive the flight path information over the S1 interface using an S1 interface application protocol message (S1-AP message).

As will be described in more detail below, the flight path information may be dynamic and periodically updated. In some instances, a complete flight path including all waypoints (with or without expected time of arrivals (ETAs), also commonly referred to as timestamps) associated with the UE 115 may be communicated to the target BS 105b. The UE 115 may be a UAV configured with an initial flight path. However, the initial flight path may change over time. The flight path may change based on conditions including, without limitation, airspace restrictions, weather conditions, battery power conditions, destination changes (e.g., determined by a UAV controller, a user, the network, a law enforcement officer or agency, or combinations thereof), routing optimizations, etc. Accordingly, in some instances the flight path information may include updated flight path information that is different than an initial flight path or a previous updated flight path. The flight path information communicated to the target BS 105b may include the updated flight path information. In some instances, the flight information may include partial flight path information. For example, the partial flight path information may include waypoints to be traveled by the UE 115 and exclude historic flight path information (e.g., waypoints already traveled) associated with the UE 115. As another example, the flight path information may include waypoints to be traveled by the UE 115 within a coverage area of a BS, within a certain distance of a BS, or a certain number of waypoints (which may be predetermined and/or dynamically configured).

To execute the handover of the UE 115 from source BS 105a to target BS 105b, the source BS 105a transmits an RRC reconfiguration message to the UE 115. The RRC reconfiguration message may include a handover command instructing the UE 115 to handover from the source BS 105a to the target BS 105b, in which the handover execution phase begins. The handover command may include flight path information associated with the UE 115. After execution of the handover to target BS 105b, the UE 115 may be connected (e.g., RRC connected state) to BS 105b. As the UE 115 travels along its flight path away from BS 105b and towards BS 105c, a handover condition may occur similar to the handover condition described above in which the UE 115 may measure a decrease in the quality of the channel between the UE 115 and the BS 105b requiring a handover of the UE 115 from the BS 105b to the BS 105c. The methods described above detailing the handover of the UE 115 from the BS 105a to the BS 105b may apply to the handover from BS 105b to BS 105c. This method of handover, including the variations described below, may be repeated with additional BSs as the UE 115 travels along the flight path.

Figure 3:
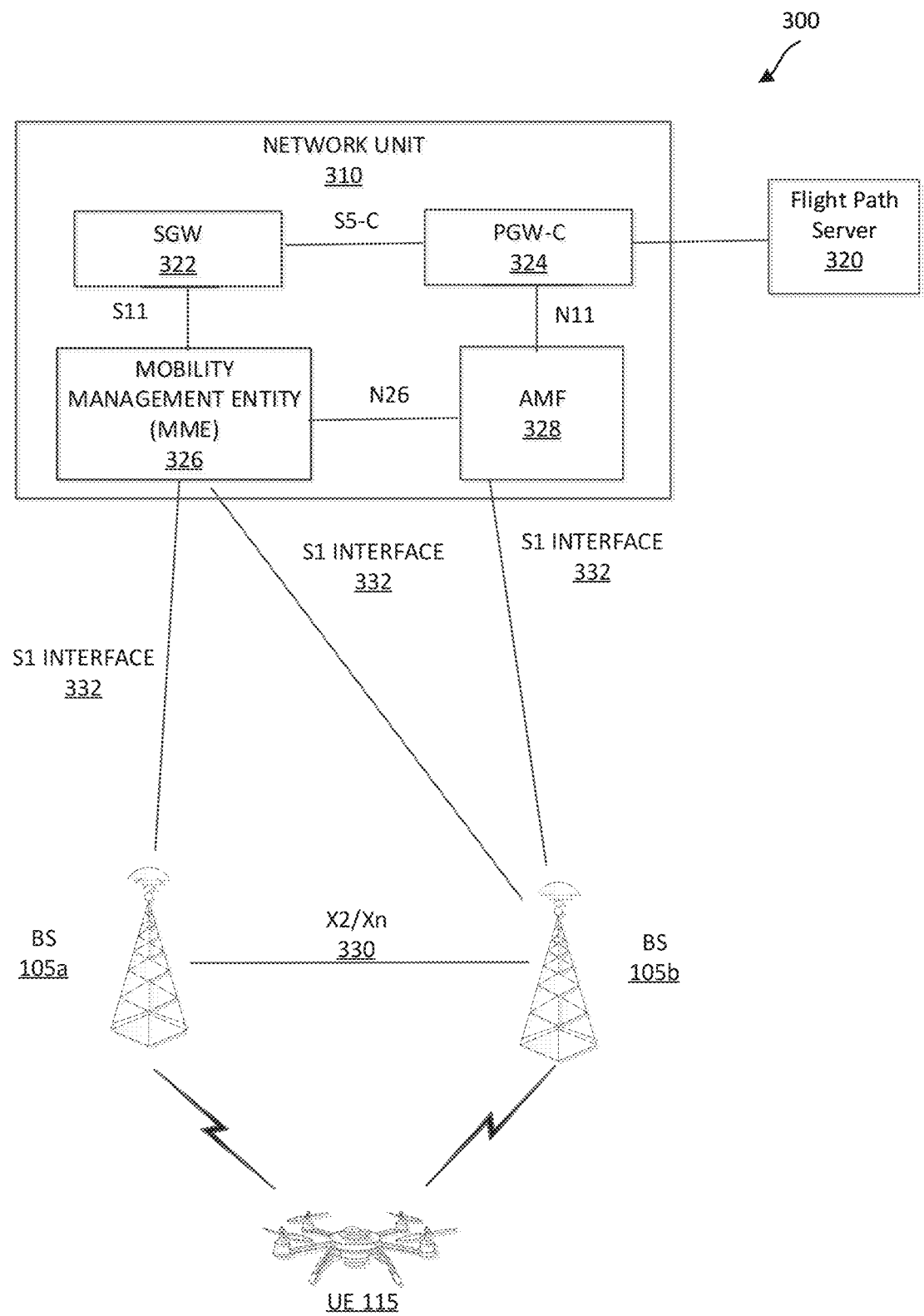
FIG. 3 is a block diagram of a wireless communication network according to aspects of the present disclosure.

FIG. 3 is a block diagram of a wireless communication network 300 according to aspects of the present disclosure. FIG. 3 illustrates a wireless communication network 300 supporting communication of UE flight path information according to aspects of the present disclosure. The network 300 may correspond to a portion of the network 100. The network 300 includes a UE 115, a BS 105a, a BS 105b, a flight path server 320, and a network unit 310. The UE 115 may correspond to the UE 115 in the network 100. The BSs 105a and 105b may correspond to BSs 105 in the network 100. The network unit 310 may be part of a core network of the network 100.

As described above with reference to FIG. 2, flight path information associated with the UE 115 may be communicated to a target BS 105b to support execution of a handover of the UE 115 from source BS 105A to target BS 105b. In some instances, the flight path information may be communicated by the BS 105a transmitting the flight path information to the BS 105b. The BS 105b may receive the flight path information transmitted by the BS 105a over an X2/Xn interface 330. The X2/Xn interface 330 may include a wired (e.g., Ethernet, fiber optic) and/or wireless (e.g., microwave) interface between the BS 105a and the BS 105b. The X2/Xn may support both a control plane and a user plane interface protocol. For example, the control plane protocol X2 application protocol (e.g., X2-AP) may be used to transfer the flight path information between the BS 105a and the BS 105b.

In some instances, the target BS 105b may receive the flight path information from the network unit 310. For example, target BS 105b may be connected to the network unit 310 via an S1 interface. The S1 interface may include a backhaul interface. The target BS 105b may be connected to a mobility management entity (MME) 326 and/or an access and mobility management function (AMF) node 328. The target BS 105b may receive the flight path information and other handover related information from the MME 326 and/or the AMF 328 over the S1 interface 332. The target BS 105b may receive the flight path information over the S1 interface 332 using an S1 interface application protocol message (S1-AP message).

The network unit 310 may include processor(s), memory, instructions, modules, and transceivers that are configured to store, process, configure, and/or communicate flight path information in support of a UE handover. In some instances, the network unit 310 may include a 5G core network (5GC), a 4G LTE Evolved Packet Core (EPC), a 3G UMTS core network, or a combination thereof. Consequently, in some aspects, the BS 105a and/or 105a may be connected to EPC and in some aspects the BS 105a and/or 105b may be connected to 5GC. The network unit 310 may include any number and type of nodes that support communication of flight path information and UE handover. For example, the network unit 310 may include an MME 326, an AMF 328, a serving gateway (SGW) 322, and a packet gateway (PGW) 324.

The MME 326 may include processor(s), memory, instructions, modules, and transceivers configured to store, process, configure and/or communicate flight path information in support of UE handover. The MME 326 may be a controller node within the network unit 310 as shown in FIG. 3. The MME 326 may be responsible for functions associated with UE 115 including mode tracking, paging, radio bearer activation, authentication, handover, and flight plan communication. The MME 326 may communicate with the BSs 105a and 105b over an S1 interface. The MME 326 may communicate with the SGW 322 over an S11 interface using a tunneling protocol. The MME 326 may communicate with the AMF 328 over a N26 interface to communicate UE mobility management (MM) and session management (SM) states.

The AMF 328 may include processor(s), memory, instructions, modules, and transceivers configured to store, process, configure and/or communicate flight path information in support of UE handover. The AMF 328 may be a controller node within the network unit 310 as shown in FIG. 3. The AMF 328 may be responsible for functions associated with the UE 115 including mode tracking, paging, radio bearer activation, authentication, handover, and flight plan communication. The AMF 328 may communicate with the BSs 105a and/or the 105b over an S1 interface. The AMF 328 may communicate with the SGW 322 over an S11 interface using a tunneling protocol. The MME may communicate with the PGW-C 324 over a N11 interface. The AMF 328 may handle connection and handover management tasks including communicating flight plan information to the target BS 105b. The AMF 328 may forward messages related to session management to the PGW-C 324 over the N11 interface.

In some instances, the flight path information may be retrieved from a flight path server 320. The flight path server 320 may be an information storage server external to the network unit 310. For example, the flight path server 320 may be operated by an entity that configures the UE 115 (e.g., a UAV) for package delivery services. The package delivery service may require the UE 115 to modify its flight path information based on changes (e.g., real time changes) in package delivery schedules and/or locations or other factors. The changes may be reflected in updated flight path information stored in flight path server 320. In some instances, the flight path server 320 may transmit the updated flight path to the MME 326 and/or the AMF 328 when the updates occur (e.g., push updates). In some instances, the MME 326 and/or the AMF 328 may request flight path information (e.g., initial flight path information, partial flight path information, and/or updated flight path information) from the flight path server 320 based on the handover condition. The flight path information request may be requested in a flightPathInfoReq message carried in a UEInformationRequest message.

In some instances, the MME 326 and/or the AMF 328 may not receive the flight path information directly from the flight path server 320. The MME 326 and/or the AMF 328 may receive the flight path information via intermediate network unit 310 nodes. For example, the packet data network gateway-control (PGW-C) 324 may act as the interface between the network unit 310 and the flight path server 320 (e.g., a flight path database server on the Internet). The PGW-C 324 may communicate the flight path information to the AMF 328. The PGW-C 324 may also communicate the flight path information to the serving gateway (SGW) 322. The SGW 322 may communicate the flight path information to the MME 326 for access by the BS 105B over the S1 interface 332.

In some instances, the UE 115 may store the flight path information. For example, the UE 115 may store the flight path information in a memory 704 as described below with reference to FIG. 7. The network unit 310 may request the flight path information to be stored in a node(s) of the network unit 310. The UE 115 may transmit the flight path information to the BS 105b over a Uu interface. In turn, the BS 105b may transmit the flight path information to the AMF 328 over the S1 interface. The AMF 328 or another node in the network unit 310 may then store the flight path information.

Figure 4:
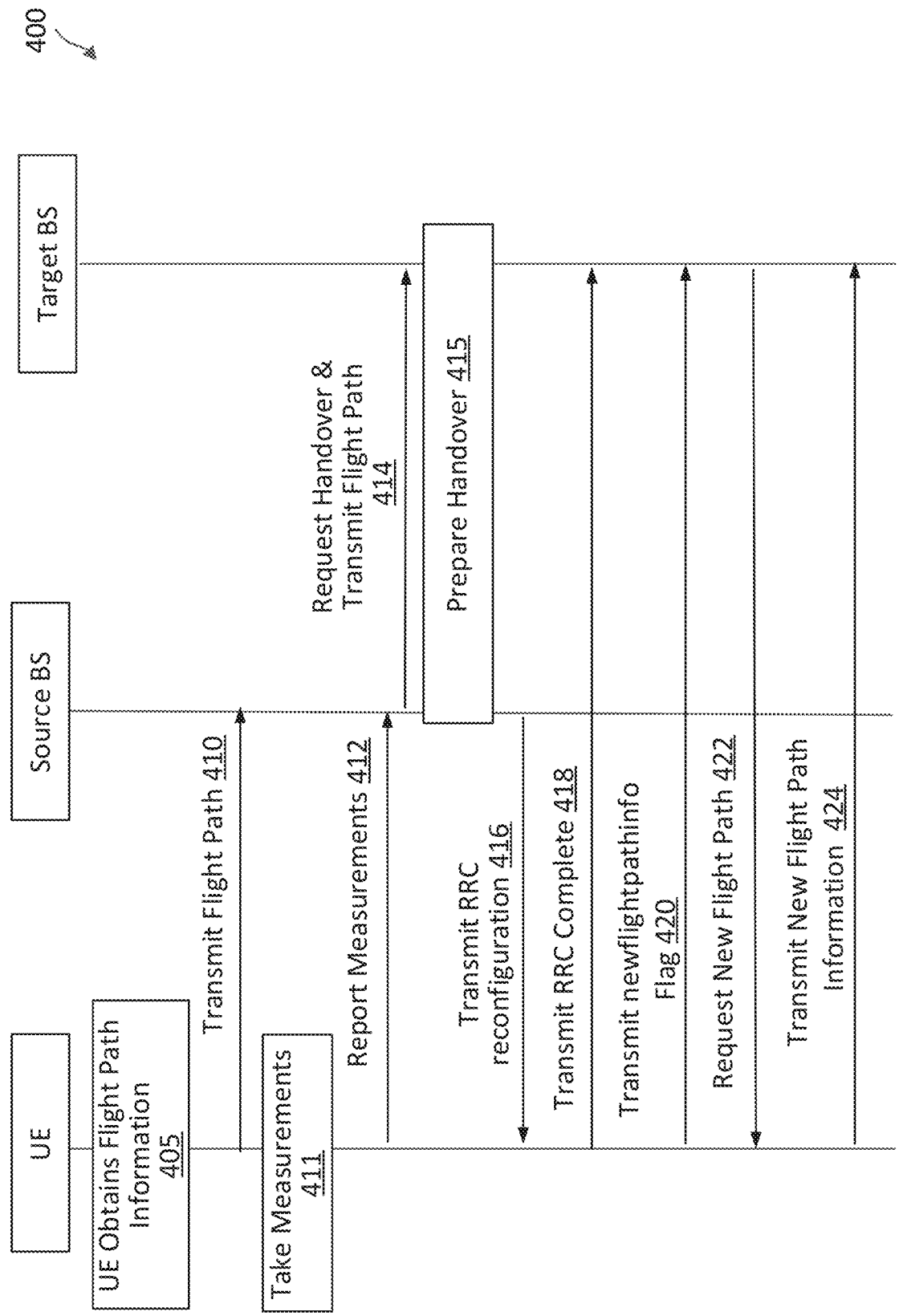
FIG. 4 is a signaling diagram illustrating a wireless communication method according to some aspects of the present disclosure.

FIG. 4 is a signaling diagram illustrating a wireless communication method 400 according to aspects of the present disclosure. The method 400 may be employed by the network 100 for handover and communication of UE flight path information. Aspects of the method 400 may be implemented by a source BS serving a UE (e.g., a UAV) in a serving cell or source cell, a target BS in a target cell, and/or a core network including a user plane function (UPF) component and an AMF/MME component. The source BS and the target BS may correspond to BSs 105 in the network 100. The UE may correspond to a UE 115 in the network 100. The core network may correspond to the network unit 310 in the network 300. The source BS and the target BS are in communication with the core network for mobility support and user plane functions. Aspects of the method 400 can be executed by computing devices (e.g., a processor, processing circuit, and/or other suitable component) of the source BS, the UE, the target BS, the network unit 310, and the AMF 328/MME 326 components. As illustrated, the method 400 includes a number of enumerated steps, but the method 400 may include additional steps before, after, and in between the enumerated steps. In some instances, one or more of the enumerated steps may be omitted or performed in a different order.

At 405, the UE obtains flight path information. The UE may obtain flight path information (e.g., complete flight path information, partial flight path information) using any method. For example, the UE may receive the flight path information over a wireless connection (e.g., cellular, WiFi, near field, etc.). In some instances, the UE may obtain the flight path information before a flight (e.g., while stationary in a staging port). In some instances, the UE may obtain the flight path information based on user input, from an application (e.g. based on the delivery destination set in the corresponding app), from a remote server (e.g. delivery management server) etc.

At 410 the UE connects (e.g., RRC connected mode) to the source BS and transmits the flight path information. For example, the UE may transmit the flight path information (e.g., a complete flight path information, a partial flight path information) over a Uu interface to the source BS.

At 411, the UE may perform channel measurements. At 412, the UE transmits a measurement report to the source BS. The measurement report may include measurements about the quality of the channel between the UE and the source BS. The measurements may include a reference signal received power (RSRP), a reference signal received quality (RSRQ), a received signal strength indicator (RSSI), and/or a signal-to-interference-noise-ratio (SINR).

At 414, the source BS may coordinate with the target BS to prepare for a handover (HO), for example, based on the measurement report indicating that the signal quality from the source BS to the UE is low. As part of the handover preparation 415, the source BS may transmit the flight path information (e.g., a complete flight path information, a partial flight path information) to the target BS to prepare for the handover. The flight path information may be carried by a flightPathInfoReport message. The source BS may communicate the UE's radio resource control (RRC) context information and/or other UE's configurations to the target BS. The target BS may prepare for the handover by reserving resources for the UE. After reserving the resources, the target BS may transmit an acknowledgement to the source BS in response to the handover request.

At 416, the source BS transmits an RRC reconfiguration message to the UE. The RRC reconfiguration message may include a handover command instructing the UE to handover from the source BS to the target BS. The handover command may include information associated with the target BS, for example, a random access channel (RACH) preamble assignment for accessing the target BS. During the handover execution, the UE may execute the handover by performing a random access procedure with the target BS. The UE may continue to communicate with the source BS while establishing a connection to the target BS.

At 418, upon a successful connection establishment to the target BS, the UE transmits an RRC reconfiguration completion message to the target BS. The UE may begin to use both the source connection to the source BS and the target connection to the target BS and prepare to release the source connection. The target BS and the source BS may coordinate with each other to prepare for the release of the source BS from serving the UE.

In some instances, the flight path information may be modified. For example, an event may occur at a waypoint and/or during travel between waypoints that causes the flight path information to change. At 420, the UE may transmit a message to the target BS indicating that new flight path information is available. For example, the UE may transmit a flag (e.g., newFlightPathInfoAvailable flag) in a message to the target BS. In response to receiving the newFlightPathInfoAvailable flag, at 422 the target BS may transmit a message requesting the new flight path information. The flight path information request may be requested in a flightPathInfoRequest message.

At 424, in response to receiving the request for the new flight path information, the UE transmits the new (e.g., updated) flight path information. The new flight path information may include complete flight path information and/or partial flight path information. The partial flight path information may include waypoints to be traveled and exclude historic flight path information (e.g., waypoints already traveled) associated with the UE. The flight path information may be communicated in a flightPathInfoReport message.

Figure 5:
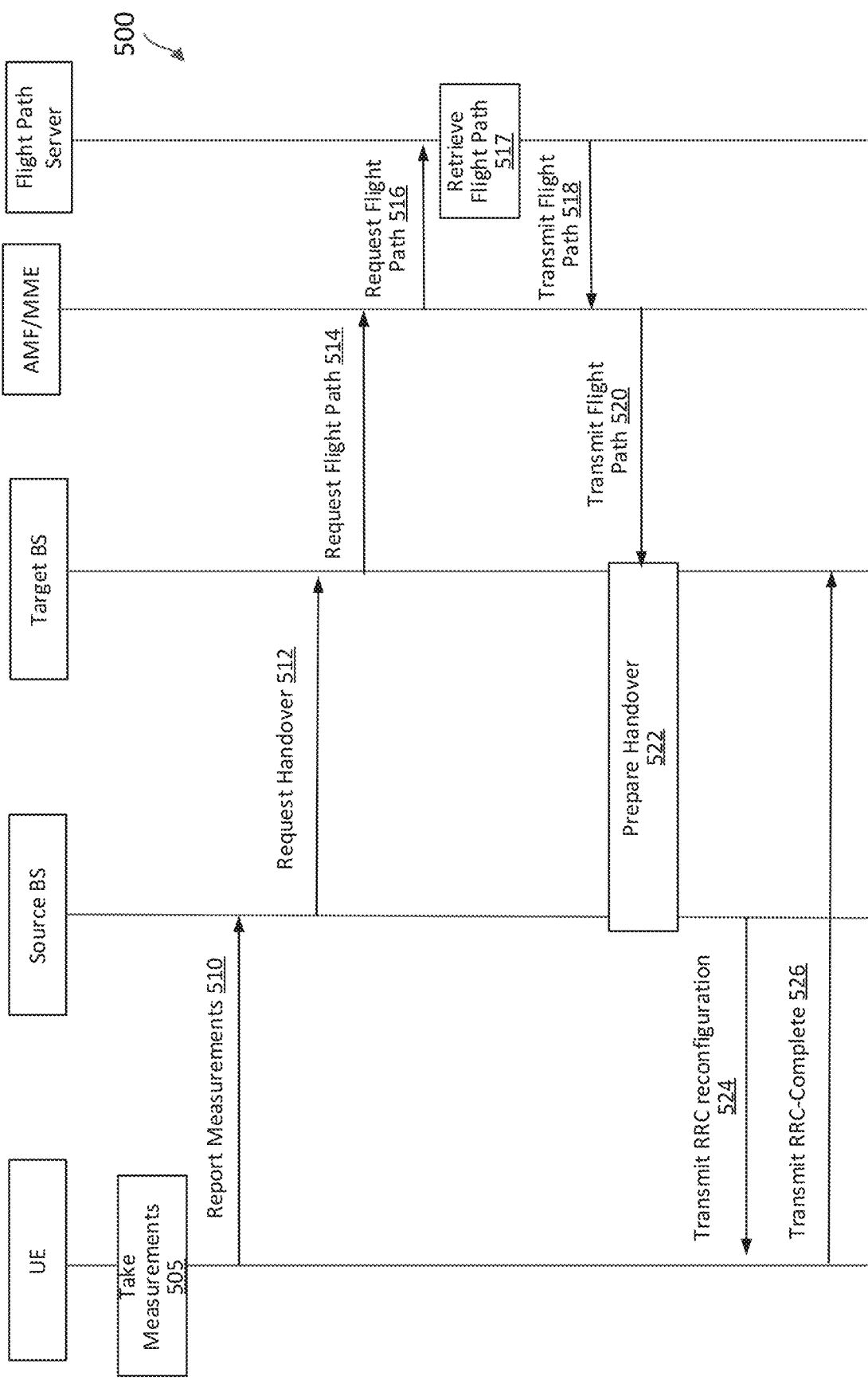
FIG. 5 is a signaling diagram illustrating a wireless communication method according to some aspects of the present disclosure.

FIG. 5 is a signaling diagram illustrating a wireless communication method 500 according to aspects of the present disclosure. The method 500 may be employed by the network 100 for UE handover and communication of UE flight path information. Aspects of the method 500 may be implemented by a source BS serving a UE (e.g., a UAV) in a serving cell or source cell, a target BS in a target cell, a core network including an MME and/or an AMF component, and a flight path server. The source BS and the target BS may correspond to BSs 105 in the network 100. The UE may correspond to a UE 115 in the network 100. The core network may correspond to the network unit 310 in the network 300. The MME may correspond to the MME 326 in the network 300. The AMF may correspond to the AMF 328 in the network 300. The flight path server may correspond to the flight path server 320 in the network 300. The source BS and the target BS are in communication with the core network for mobility support and user plane functions. Aspects of the method 500 can be executed by computing devices (e.g., a processor, processing circuit, and/or other suitable component) of the source BS, the UE, the target BS, the AMF 328/MME 326 component, the network unit 310, and the flight path server. As illustrated, the method 500 includes a number of enumerated steps, but the method 500 may include additional steps before, after, and in between the enumerated steps. In some instances, one or more of the enumerated steps may be omitted or performed in a different order.

At 505, the UE may perform channel measurements. At 510, the UE transmits a measurement report. The measurement report may include measurements about the quality of the channel between the UE and the source BS. The measurements may include a reference signal received power (RSRP), a reference signal received quality (RSRQ), a received signal strength indicator (RSSI), and/or a signal-to-interference-noise-ratio (SINR).

At 512, the source BS may coordinate with the target BS to prepare for a handover (HO), for example, based on the measurement report indicating that the signal quality from the source BS to the UE is low.

At 514, the target BS may transmit a request for flight path information to the AMF and/or the MME. In response to the request for flight path information, at 516, the AMF and/or the MME may request the flight path information from the flight path server. As described above with reference to FIG. 3, the request for the flight path server may be routed through a gateway (e.g., a serving gateway, a packet data network gateway) to the flight path server. The flight path server may be a server (e.g., an external server comprising a database(s)) accessed by the gateway via the Internet.

At 517, in response to receiving the request for flight path information, the flight path server may retrieve the flight path information from a database. The flight path information may include complete flight path information and/or partial flight path information.

At 518, the flight path server may transmit the flight path information to the AMF/MME.

At 520, the AMF/MME may transmit the flight path information to the target BS.

At 522, the source BS may communicate the UE's radio resource control (RRC) context information and/or other UE's configurations to the target BS. The target BS may prepare for the handover by reserving resources for the UE.

After reserving the resources, the target BS may transmit an acknowledgement to the source BS in response to the handover request.

At 524, the source BS transmits an RRC reconfiguration message to the UE. The RRC reconfiguration message may include a handover command instructing the UE to handover from the source BS to the target BS. The handover command may include information associated with the target BS, for example, a random access channel (RACH) preamble assignment for accessing the target BS. During the handover execution, the UE may execute the handover by performing a random access procedure with the target BS. The UE may continue to communicate with the source BS while establishing a connection to the target BS.

At 526, upon a successful connection establishment to the target BS, the UE transmits an RRC reconfiguration completion message to the target BS. The UE may begin to use both the source connection to the source BS and the target connection to the target BS and prepare to release the source connection. The target BS and the source BS may coordinate with each other to prepare for the release of the source BS from serving the UE.

Figure 6:
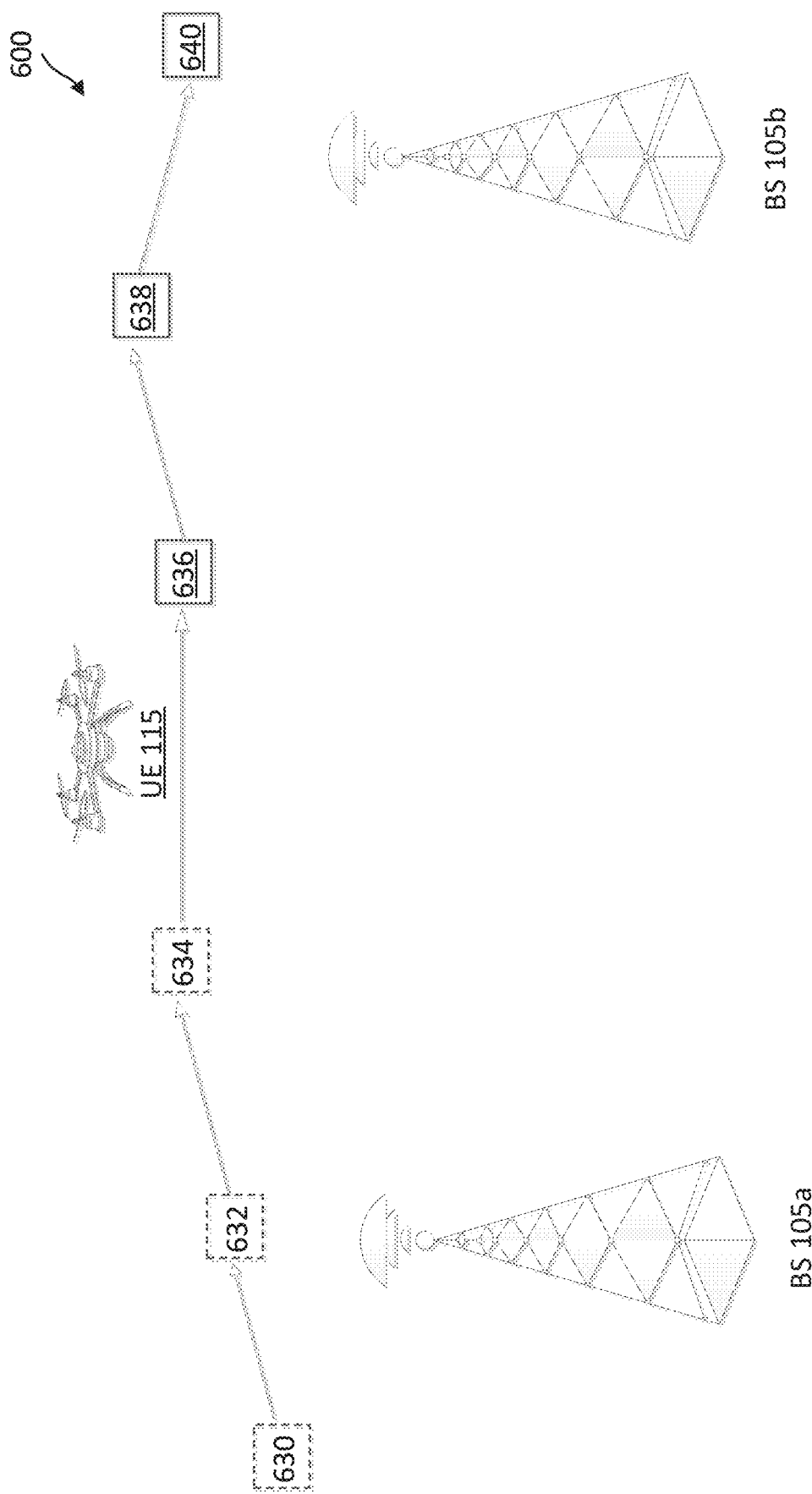
FIG. 6 illustrates a flight path of a UE according to some aspects of the present disclosure.

FIG. 6 illustrates a flight path of a UE 115 according to some aspects of the present disclosure. FIG. 6 illustrates a flight path of a UE 115 in a network 600. The UE 115 may correspond to a UE 115 in the network 100. The network 600 may correspond to the network 100. The source BS 105a and the target BS 105b may correspond to the BSs in network 100.

As described with reference to FIGS. 2-5, a UE 115 may handover communications from source BS 105a to target BS 105b. Flight path information may be communicated to the target BS 105b in support of the handover operation. In some instances, the UE 115 may be a UAV that follows a flight path defined in the flight path information. The flight path information may include a sequence of waypoints and ETAs. The waypoints may include locations (e.g., GPS locations) corresponding to a latitude, a longitude, and an altitude. In some instances, flight path information may include exclusion zones (e.g., no-fly zones).

Referring to FIG. 6, the waypoints may include waypoints 630, 632, 634, 636, 638, and 640. The UE may fly from one waypoint to the next waypoint in the sequence of waypoints. FIG. 6 shows waypoints 630, 632, and 634 in dashed line boxes that corresponds to waypoints previously traveled. Waypoints 636, 638, and 640 correspond to waypoints yet to be traveled by the UE 115. In some instances, the flight path information communicated to the target BS 105b may include the complete sequence of waypoints. In some instances, the flight path information may be partial flight path information that includes the waypoints 636, 638, and 640 yet to be traveled and excludes the historical waypoints 630, 632, and 634. By communicating partial flight path information to the target BS 105b that excludes historical waypoints, the amount of data transmitted in the partial flight path information may be reduced as compared to the amount of data in the complete flight path information, thereby reducing the data load on network 600.

In some instances, the waypoints yet to be traveled by the UE 115 may change based on the occurrence of events. For example, the UE 115 may execute a package delivery service that updates the package delivery locations dynamically. As another example, a weather change event or a UE 115 power source event may require a change in the flight path information. In order to update the target BS 105 with the updated flight path information, the UE 115, the source BS 105a and/or a network unit (e.g., the network unit 310, the flight path server 320) may communicate a flag (e.g., newFlightPathInfoAvailable) indicating updated flight path information is available. The flag (e.g., newFlightPathInfoAvailable) may indicate to the target BS 105b whether the flight path information communicated to the target BS 105 is still valid. Further, the UE 115 may be configured to indicate to the target BS 105b whether it is capable of indicating whether the flight path information communicated to the target BS 105 is still valid.

In some instances, the network 600 can configure the UE 115 to provide the flag indicating updated flight information is available. However, the interpretation of the flag flightPathInfoAvailable may be different depending on the configuration of the UE 115. For example, if the UE 115 supports the newFlightPathInfoAvailable flag, when the UE 115 communicates the flightPathInfoAvailable to a target BS, it is clear to the network 600 that the UE 115 intends to send new flight path information and thus the flight path information obtained from a network unit may not be accurate. In this case, the target BS may receive the new flight path information from the UE 115. In some instances, if the UE 115 is not configured to indicate support of the newFlightPathInfoAvailable flag, the target BS 105b may use the flight path information obtained from the flight path server. The UE 115 may communicate to the BS 105a and/or the BS 105b one or more capabilities regarding indicating updated flight path information. For example, the UE 115 may be configured to indicate to the target BS 105b whether it is capable of indicating whether the flight path information communicated to the target BS 105 is still valid or updated flight path information is available.

Figure 7:
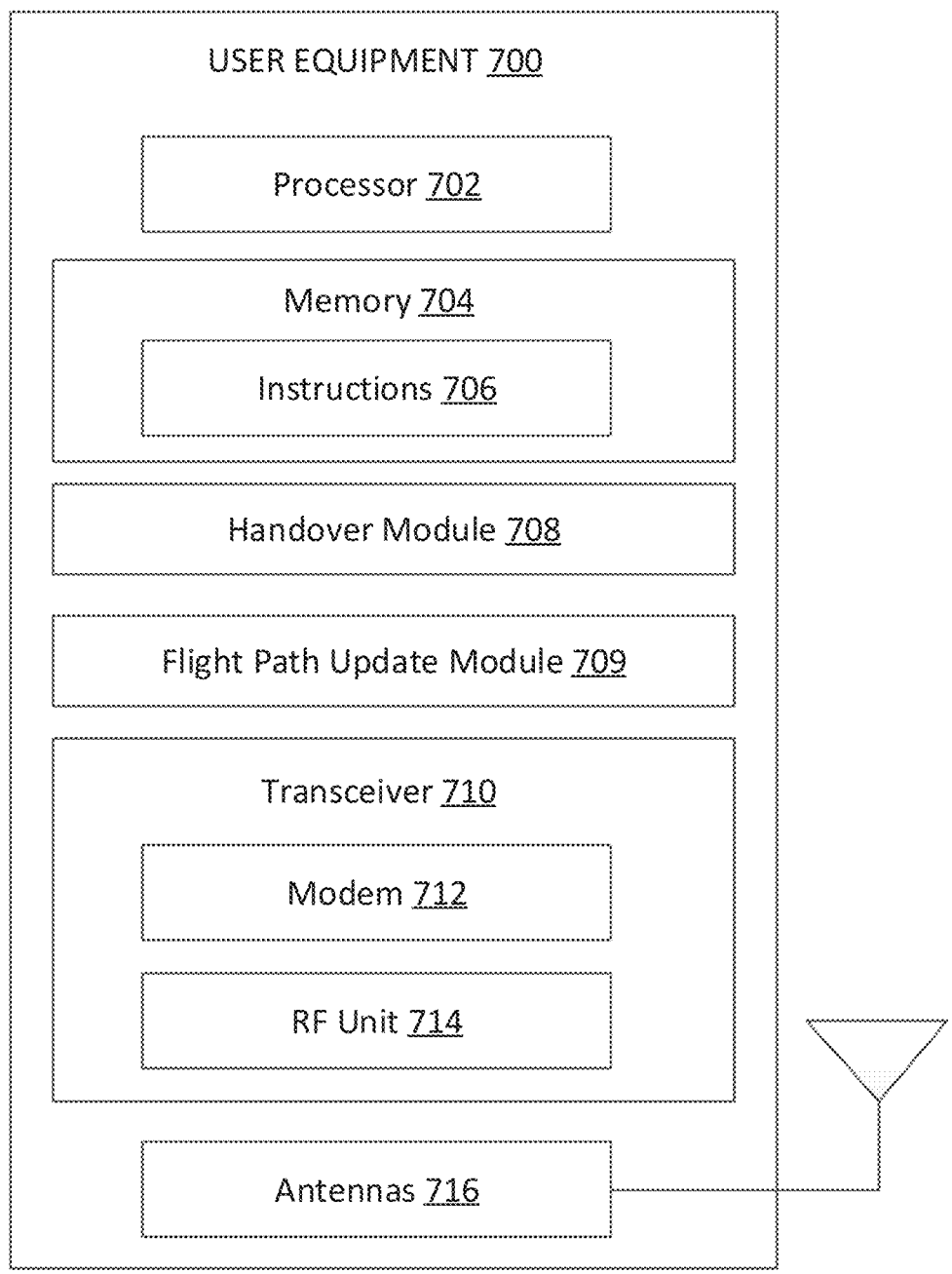
FIG. 7 is a block diagram of an exemplary user equipment (UE) according to some aspects of the present disclosure.

FIG. 7 is a block diagram of an exemplary UE 700 according to some aspects of the present disclosure. The UE 700 may be the UE 115 in the network 100 as discussed above. The UE 700 may be a UAV. As shown, the UE 700 may include a processor 702, a memory 707, a handover module 708, a flight path update module 709, a transceiver 710 including a modem subsystem 712 and a radio frequency (RF) unit 714, and one or more antennas 716. These elements may be coupled with each other and in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 704 includes a non-transitory computer-readable medium. The memory 704 may store instructions 706. The instructions 706 may include instructions that, when executed by the processor 702, cause the processor 702 to perform the operations described herein with reference to the UEs 115 in connection with aspects of the present disclosure, for example, aspects of FIGS. 2-6 and 9-10. Instructions 706 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

Each of the handover module 708 and the flight path update module 709 may be implemented via hardware, software, or combinations thereof. For example, each of the handover module 708 and the flight path update module 709 may be implemented as a processor, circuit, and/or instructions 706 stored in the memory 704 and executed by the processor 702. In some examples, a UE may include one of the handover module 708 or the flight path update module 709. In other examples, a UE may include both the handover module 708 and the flight path update module 709.

The handover module 708 and the flight path update module 709 may be used for various aspects of the present disclosure, for example, aspects of FIGS. 2-6 and 9-10. The handover module 708 is configured to perform channel measurements for a channel between the UE 700 and a serving BS or source BS (e.g., the BSs 105), report channel measurements to the BS, receive a handover command from the source BS to handover to a target BS, establish a connection with the target BS while continuing to communicate with the source BS, transmit a handover completion indication to the target BS upon a successful connection with the target BS, receive an instruction from the target BS to release the connection with the source BS after the handover, stop communication with the source BS, and switch to communication with the target BS. The handover operations can be substantially similar to aspects of the methods 400 and/or 500 described with reference to FIGS. 4 and 5 respectively.

The flight path update module 709 is configured to provide the UE with flight path information. The flight path update module 709 is further configured to communicate flight path information to/from a BS and/or a network unit (e.g., a core network node). The flight path update module 709 is further configured to update the flight path information to comprise partial flight path information that includes waypoints to be traveled by the UE and excludes historic flight path information associated with the UE. The flight path update module 709 is further configured to communicate a handover message that includes the flight path information. The flight path update module 709 may communicate the flight path information over a Uu interface, and/or a sidelink interface application protocol message. The flight path update module 709 may be configured to communicate an indicator (e.g., a flag) that indicates whether updated flight path information is available.

As shown, the transceiver 710 may include the modem subsystem 712 and the RF unit 714. The transceiver 710 can be configured to communicate bi-directionally with other devices, such as the BSs 105. The modem subsystem 712 may be configured to modulate and/or encode the data from the memory 704, the handover module 708, and/or the flight path update module 709 according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together at the UE 115 to enable the UE 115 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The antennas 716 may include multiple antennas of similar or different designs in order to sustain multiple transmission links. The RF unit 714 may configure the antennas 716.

In some instances, the UE 700 can include multiple transceivers 710 implementing different RATs (e.g., NR and LTE). In some instances, the UE 700 can include a single transceiver 710 implementing multiple RATs (e.g., NR and LTE). In some instances, the transceiver 710 can include various components, where different combinations of components can implement RATs.

In some aspects, the processor 702 may be coupled to the memory 704, the handover module 708, the flight path update module 709, and/or the transceiver 710. The processor 702 and may execute operating system (OS) code stored in the memory 704 in order to control and/or coordinate operations of the handover module 708, the flight path update module 709, and/or the transceiver 710. In some aspects, the processor 702 may be implemented as part of the handover module 708 and/or the flight path update module 709. In some aspects, the processor 702 is configured to transmit via the transceiver 710, to a BS, to another UE, or to a network unit, flight path information. The flight path information may include, without limitation, a sequence of waypoints and ETAs.

Figure 8:
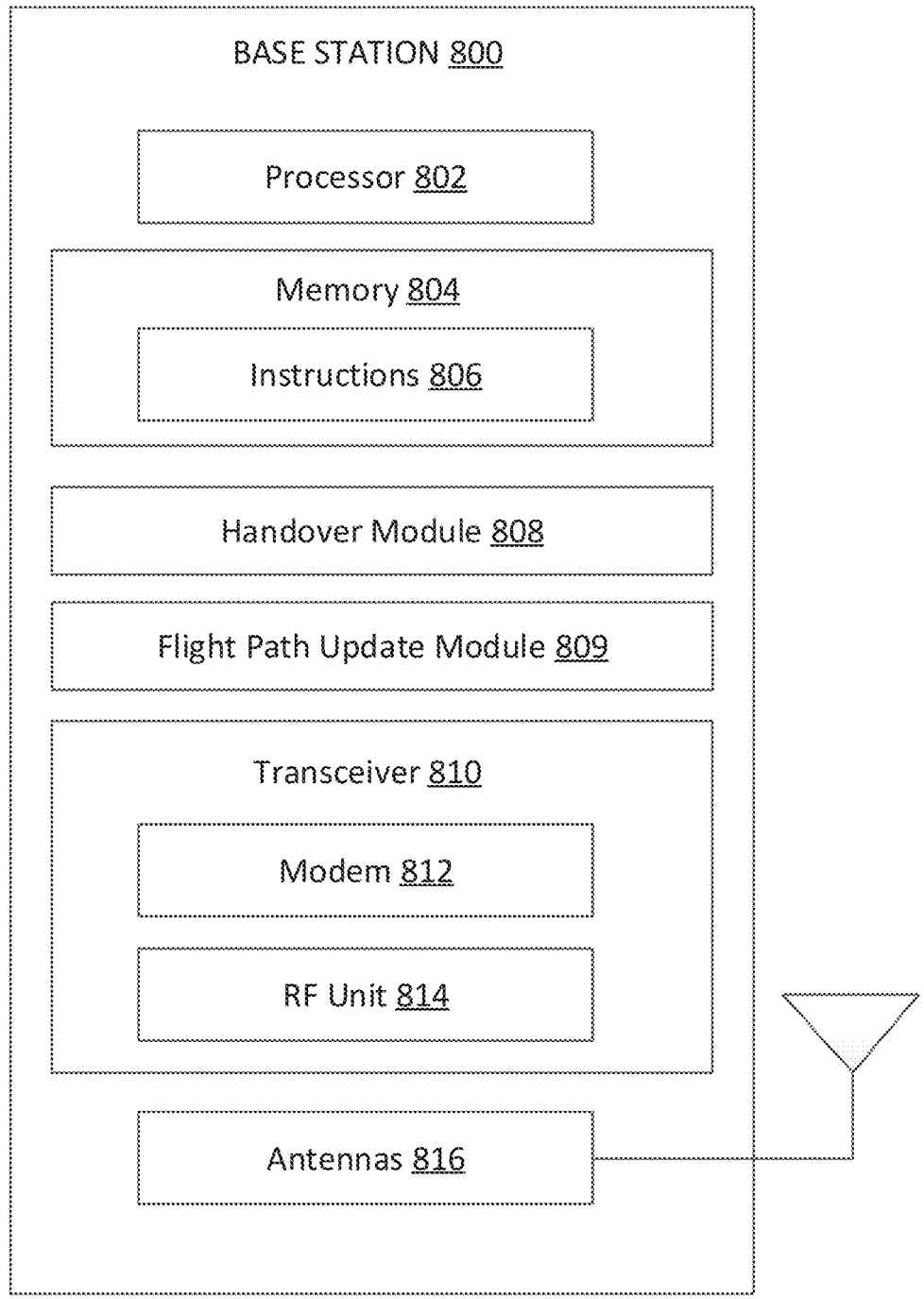
FIG. 8 is a block diagram of an exemplary base station (BS) according to some aspects of the present disclosure.

FIG. 8 is a block diagram of an exemplary BS 800 according to some aspects of the present disclosure. The BS 800 may be a BS 105 as discussed above. As shown, the BS 800 may include a processor 802, a memory 804, a handover module 808, a flight path update module 809, a transceiver 810 including a modem subsystem 812 and a RF unit 814, and one or more antennas 816. These elements may be coupled with each other and in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 2-6 and 9-10. Instructions 806 may also be referred to as code, which may be interpreted broadly to include any type of computer-readable statement(s).

Each of the handover module 808 and the flight path update module 809 may be implemented via hardware, software, or combinations thereof. For example, each of the handover module 808 and the flight path update module 809 may be implemented as a processor, circuit, and/or instructions 806 stored in the memory 804 and executed by the processor 802. In some examples, a BS may include one of the handover module 808 or the flight path update module 809. In other examples, a BS may include both the handover module 808 and the flight path update module 809.

The handover module 808 and the flight path update module 809 may be used for various aspects of the present disclosure, for example, aspects of FIGS. 2-6 and 9-10. The handover module 808 is configured to receive channel measurement reports from a UE (e.g., the UEs 115, 700), determine whether to handover the UE to another BS based on the received channel measurement reports, transmit handover requests to one or more target BSs, coordinate with a target BS to prepare for a handover, transmit a handover command to the UE instructing the UE to handover to the target BS, continue to communicate with the UE while the UE establishes a connection with the target BS, coordinate with the target BS to prepare to release the connection with the UE, forward any remaining UE data to the target BS, receive an instruction from the target BS to release the connection to the UE, and release the connection to the UE. The handover operations can be substantially similar to aspects of the methods 400 and/or 500. The BS 800 can also be a target BS, where the handover module 808 is configured to receive a handover request from a source BS, allocate resources to prepare for a UE to handover to the BS 800, monitor for a random access preamble signal from the UE, respond with a random access response, perform timing-advance, and provide a UL scheduling grant for the UE, receive a handover completion indication from the UE, coordinate with the source BS to release the source BS from connecting to the UE, and/or transmit an instruction to the UE to release the connection to the source BS. Additionally or alternatively, the handover module 808 and the flight path update module 809 can be implemented in any combination of hardware and software, and may, in some implementations, involve, for example, processor 802, memory 804, instructions 806, transceiver 810, and/or modem 812.

The flight path update module 809 is configured to provide the BS 800 with flight path information associated with a UE (e.g., the UE 115 or the UE 700). The flight path update module 809 is further configured to communicate flight path information to/from a UE, another BS and/or a network unit (e.g., a core network node). The flight path update module 809 is further configured to update the flight path information to comprise partial flight path information that includes waypoints to be traveled by the UE and excludes historic flight path information associated with the UE.

The flight path update module 809 is further configured to communicate a handover message that includes the flight path information. The flight path update module 809 may communicate (e.g., transmit and/or receive) the flight path information over an X2 interface, an Xn interface, and/or an S1 interface application protocol message. The flight path update module 809 may be configured to communicate an indicator that indicates whether updated flight path information is available.

As shown, the transceiver 810 may include the modem subsystem 812 and the RF unit 814. The transceiver 810 can be configured to communicate bi-directionally with other devices, such as the UEs 115 and/or 700 and/or another core network unit. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 115, or 700. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 105 to enable the BS 105 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, transmission of information to execute a handover of a UE and/or transmission of flight path information according to aspects of the present disclosure. The antennas 816 may further receive data messages (e.g., flight path information) transmitted from other devices and provide the received data messages for processing and/or demodulation at the transceiver 810. The antennas 816 may include multiple antennas of similar or different designs in order to sustain multiple transmission links.

In some instances, the BS 800 can include multiple transceivers 810 implementing different RATs (e.g., NR and LTE). In some instances, the BS 800 can include a single transceiver 810 implementing multiple RATs (e.g., NR and LTE). In some instances, the transceiver 810 can include various components, where different combinations of components can implement RATs.

In some aspects, the processor 802 may be coupled to the memory 804, the handover module 808, the flight path update module 809, and/or the transceiver 810. The processor 802 may execute OS code stored in the memory 804 to control and/or coordinate operations of the handover module 808, the flight path update module 809, and/or the transceiver 810. In some aspects, the processor 802 may be implemented as part of the handover module 808 and/or the flight path update module 809. In some aspects, the processor 802 is configured to receive via the transceiver 810, from a UE, another BS and/or a network unit, flight path information. The flight path information may include, without limitation, a sequence of waypoints and ETAs.

Figure 9:
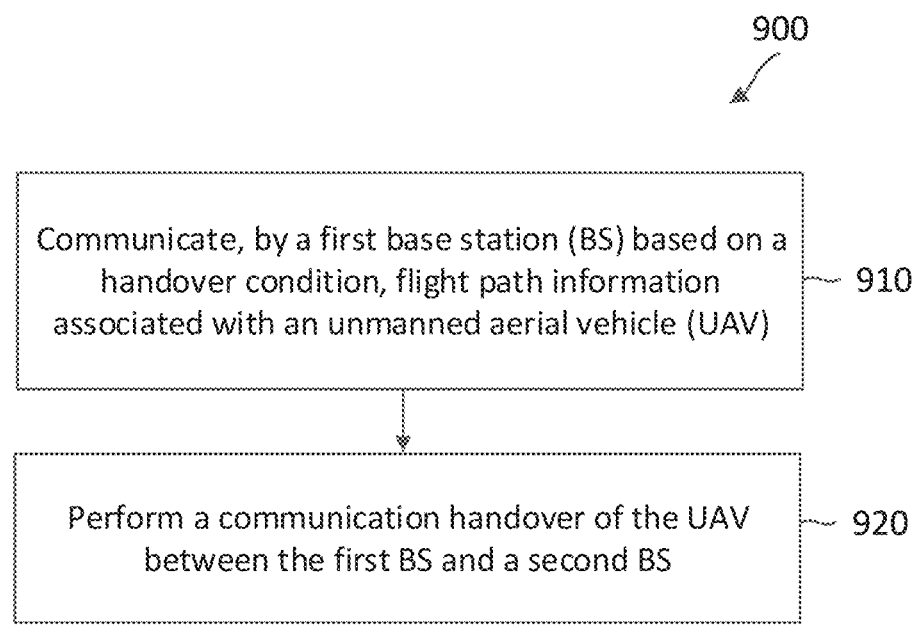
FIG. 9 is a flow diagram of a communication method according to some aspects of the present disclosure.

FIG. 9 is a flow diagram of a communication method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as the BS 105 or BS 800, may utilize one or more components, such as the processor 802, the memory 804, the handover module 808, the flight path update module 809, the transceiver 810, the modem 812, and the one or more antennas 816, to execute aspects of method 900. The method 900 may employ similar mechanisms as in the networks 200 and 300 and the methods 400, 500, and 600 described with respect to FIGS. 2-6, respectively. As illustrated, the method 900 includes a number of enumerated steps, but the method 900 may include additional steps before, after, and in between the enumerated steps. In some instances, one or more of the enumerated steps may be omitted or performed in a different order.

At 910, the method 900 of wireless communication performed by a target base station (e.g., the BSs 105 and 800) includes communicating, based on a handover condition, flight path information associated with an unmanned aerial vehicle (UAV). The UAV may be the UE 115 and/or the UE 700. Communicating, based on a handover condition, flight path information associated with a UAV may be performed as described above with reference to FIGS. 2-6.

In some instances, the communicating the flight path information associated with the UAV comprises receiving the flight path information. In this regard, the base station may be a target base station and receive the flight path information from the UAV, the source BS, a network unit, or other device. For example, in some instances the target base station may receive the flight path information from the UAV via at least one of a Uu interface or a sidelink interface. In this regard, the target base station may receive the flight path information from the UAV via at least one of a flightPathInfoReport or a flightPathInfoAvailable message. In some instances, the target base station may receive the flight path information from the source BS via at least one of an X2 or an Xn interface. In this regard, the target base station may receive the flight path information from the source BS via a X2-AP message. In some aspects, the target BS receives a handover request message from the source BS that includes the flight path information. In some instances, the target base station may receive the flight path information from the network unit via an S1 interface. In this regard, the target base station may receive the flight path information from the network unit via at least one of an S1 interface application protocol message. In some instances, the flight path information may comprise partial flight path information associated with the UAV. In this regard, the partial flight path information may comprise waypoints to be traveled by the UAV and exclude historic flight path information associated with the UAV. In some instances, the target BS may receive an indicator indicating that updated flight path information is available. In this regard, the target BS may receive a flightPathInfoAvailable message. In response to receiving the flightPathInfoAvailable message, the target BS may request the updated flight path information.

At 920, the method 900 includes performing a communication handover of the UAV between the target BS and a source BS (e.g., the BSs 105 and 800). Performing a communication handover of the UAV between the target BS and a source BS may be performed as described above with reference to FIGS. 2-6. In some instances, the performing the communication handover of the UAV between the target BS and the source BS comprises handing over the UAV from the source BS to the target BS. In this regard, the UAV may perform channel measurements. The UAV may transmit a measurement report to the source BS. The measurement report may include measurements about the quality of the channel between the UAV and the source BS. The measurement report may include measurements about the quality of the channel between the UAV and the target BS. The measurements may include a reference signal received power (RSRP), a reference signal received quality (RSRQ), a received signal strength indicator (RSSI), and/or a signal-to-interference-noise-ratio (SINR).

In some instances, the source BS may coordinate with the target BS to prepare for a handover of the UAV based on the handover condition. In this regard, the handover condition may be based on the measurement report indicating that the signal quality from the source BS to the UAV is low. As part of the handover preparation, the source BS may transmit the flight path information (e.g., a complete flight path information, a partial flight path information) to the target BS to prepare for the handover. In this regard, the flight path information may be carried by a flightPathInfoReport message. The source BS may communicate the UAV's radio resource control (RRC) context information and/or other UAV's configurations to the target BS. The target BS may prepare for the handover by reserving resources for the UAV. In this regard, the target BS may transmit an acknowledgement to the source BS in response to the handover request. In some instances, the source BS transmits an RRC reconfiguration message to the UAV. In this regard, the RRC reconfiguration message may include a handover command instructing the UAV to handover from the source BS to the target BS. In some instances, the UAV may continue to communicate with the source BS while establishing a connection to the target BS. In some instances, upon a successful connection establishment to the target BS, the UAV transmits an RRC reconfiguration completion message to the target BS. In this regard, the UAV may begin to use both the connection to the source BS and the connection to the target BS and prepare to release the source connection. The target BS and the source BS may coordinate with each other to prepare for the release of the source BS from serving the UE.

Figure 10:
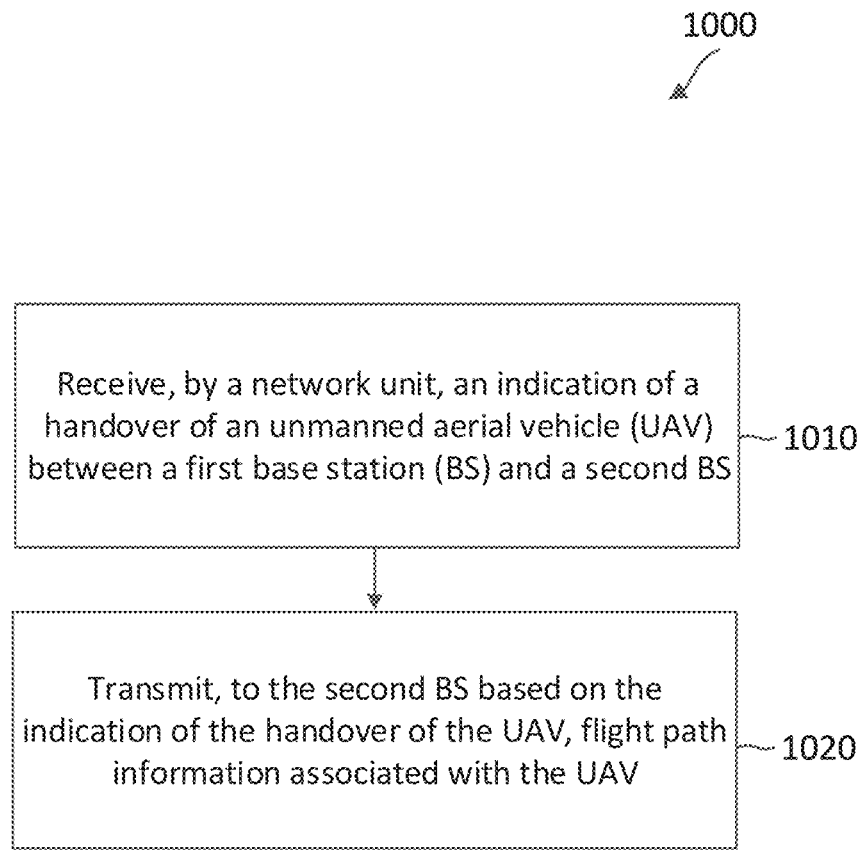
FIG. 10 is a flow diagram of a communication method according to some aspects of the present disclosure.

FIG. 10 is a flow diagram of a communication method 1000 performed by a network unit according to some aspects of the present disclosure. Steps of the method 1000 can be executed by a computing device (e.g., a processor, processing circuit, and/or other suitable component) of a communication device or other suitable means for performing the steps. For example, a communication device, such as the network unit 310, may utilize one or more components, such as a processor, a memory, a handover module, a flight path update module, a transceiver, a modem, and one or more antennas/transceivers, to execute the steps of method 1000. The method 1000 may employ similar mechanisms as in the networks 200, 300, 600 and in the methods 400 and 500 described with respect to FIGS. 2-6, respectively. As illustrated, the method 1000 includes a number of enumerated steps, but the method 1000 may include additional steps before, after, and in between the enumerated steps. In some instances, one or more of the enumerated steps may be omitted or performed in a different order.

At step 1010, the method 1000 of wireless communication performed by a network unit 310 includes receiving an indication of a handover of an unmanned aerial vehicle (UAV) between a target base station (BS) and a source BS. The UAV may be the UE 115 and/or the UE 700. The target BS and the source BS may be BS 105. Receiving an indication of a handover of an unmanned aerial vehicle (UAV) between a target base station (BS) and a source BS may be performed as described above with reference to FIGS. 3 and 5.

In some instances, the receiving, by the network unit, the indication of the handover of the UAV between the target BS and the source BS comprises receiving the indication from at least one of the target BS or the source BS. For example, the network unit may receive the handover indication via an S1 interface from the target BS or the source BS. In this regard, the network unit may receive the handover indication in an RRC message.

At step 1020, the method 1000 includes transmitting, to the source BS based on the indication of the handover of the UAV, flight path information associated with the UAV (e.g., the UEs 115 and 700). Transmitting, to the source BS based on the indication of the handover of the UAV, flight path information associated with the UAV may be performed as described above with reference to FIGS. 3 and 5.

In some instances, the transmitting, to the source BS based on the indication of the handover of the UAV, flight path information associated with the UAV may comprise retrieving the flight path information from a flight path server. In this regard, the flight path server may be an information storage server external to the network unit. For example, the flight path server may be operated by an entity that configures the flight path for the UAV. In some instances, the flight path server may transmit the flight path information to a node in the network unit. In this regard, the flight path server may transmit the flight plan information to an MME and/or an AMF associated with the network unit.

In some instances, the MME and/or the AMF may request flight path information (e.g., initial flight path information, partial flight path information, and/or updated flight path information) from the flight path server based on the handover condition. In this regard, the flight path information request may be requested in a flightPathInfoReq message carried in a UEInformationRequest message.

In some instances, the MME and/or the AMF may not receive the flight path information directly from the flight path server. The MME and/or the AMF may receive the flight path information via intermediate network unit nodes. In this regard, the packet data network gateway-control (PGW-C) may act as the interface between the network unit and the flight path server (e.g., a flight path database server on the Internet). The PGW-C may communicate the flight path information to the AMF. In some instances, the PGW-C may also communicate the flight path information to the serving gateway (SGW). In this regard, the SGW may communicate the flight path information to the MME for access by the BS 105B over the S1 interface.

By way of non-limiting examples, the following aspects are included in the present disclosure.

Aspect 1 includes a method of wireless communication performed by a first base station (BS), the method comprising communicating, based on a handover condition, flight path information associated with an unmanned aerial vehicle (UAV), and performing a communication handover of the UAV between the first BS and a second BS.

Aspect 2 includes the method of aspect 1, wherein the communicating the flight path information associated with the UAV comprises receiving the flight path information, and the performing the communication handover comprises performing the communication handover of the UAV from the second BS to the first BS.

Aspect 3 includes the method of any of aspects 1-2, wherein the receiving the flight path information further comprises receiving, from the UAV, the flight path information.

Aspect 4 includes the method of any of aspects 1-3, wherein at least one of the first BS or the second BS is communicatively coupled to a 5G Core network unit.

Aspect 5 includes the method of any of aspects 1-4, wherein the receiving the flight path information further comprises receiving, from a network, the flight path information.

Aspect 6 includes the method of any of aspects 1-5, wherein the receiving the flight path information further comprises receiving, from the second BS, the flight path information.

Aspect 7 includes the method of any of aspects 1-6, wherein the receiving the flight path information further comprises receiving, from the second BS, a handover request message comprising the flight path information.

Aspect 8 includes the method of any of aspects 1-7, wherein the communicating the flight path information associated with the UAV comprises transmitting, to the second BS, the flight path information, and the performing the communication handover comprises performing the communication handover of the UAV from the first BS to the second BS.

Aspect 9 includes the method of any of aspects 1-8, wherein the transmitting the flight path information associated with the UAV further comprises transmitting, to the second BS, a handover request message comprising the flight path information.

Aspect 10 includes the method of any of aspects 1-9, wherein the communicating the flight path information further comprises communicating, with the second BS, the flight path information over at least one of an X2 interface or an Xn interface.

Aspect 11 includes the method of any of aspects 1-10, wherein the flight path information comprises partial flight path information associated with the UAV.

Aspect 12 includes the method of any of aspects 1-11, wherein the partial flight path information comprises waypoints to be traveled by the UAV and excludes historic flight path information associated with the UAV.

Aspect 13 includes the method of any of aspects 1-12, wherein the flight path information comprises an estimated time of arrival for one or more of the waypoints to be traveled by the UAV Aspect 14 includes the method of any of aspects 1-13, further comprising receiving an indicator indicating that updated flight path information is available.

Aspect 15 includes the method of any of aspects 1-14, wherein the communicating the flight path information associated with the UAV comprises receiving, from a networked UAV controller, the flight path information.

Aspect 16 includes a method of communication performed by a network unit, the method comprising receiving an indication of a handover of an unmanned aerial vehicle (UAV) from a first base station (BS) to a second BS, and transmitting, to the second BS based on the indication of the handover of the UAV, flight path information associated with the UAV.

Aspect 17 includes the method of aspect 16, further comprising at least one of receiving the flight path information from the UAV, retrieving the flight path information from a server configured to store the flight path information, or receiving the flight path information from the first BS.

Aspect 18 includes the method of any of aspects 16-17, wherein the transmitting the flight path information associated with the UAV comprises transmitting, to the second BS, the flight path information via an S1 interface application protocol message.

Aspect 19 includes the method of any of aspects 16-18, further comprising transmitting, to the second BS, an indicator indicating that updated flight path information is available.

Aspect 20 includes the method of any of aspects 16-19, wherein the network unit comprises at least one of a mobility management entity node or an access and mobility management function node.

Aspect 21 includes a first base station (BS) comprising a transceiver, a memory, and a processor coupled to the transceiver and the memory, the processor configured to perform any one of aspects 1-15.

Aspect 22 includes a network unit comprising a transceiver, a memory, and a processor coupled to the transceiver and the memory, the processor configured to perform any one of aspects 16-20.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a first base station (BS), the method comprising:
   communicating, based on a handover condition, flight path information associated with an unmanned aerial vehicle (UAV), wherein the flight path information comprises one or more upcoming waypoints to be traveled by the UAV and one or more timestamps associated with the one or more upcoming waypoints; and
   performing, based on the one or more upcoming waypoints and the one or more timestamps, a communication handover of the UAV between the first BS and a second BS.

2. The method of claim 1, wherein:
   the communicating the flight path information associated with the UAV comprises:
   receiving the flight path information; and
   the performing the communication handover comprises:
   performing the communication handover of the UAV from the second BS to the first BS.

3. The method of claim 2, wherein the receiving the flight path information further comprises:
   receiving, from the UAV, the flight path information.

4. The method of claim 3, wherein at least one of the first BS or the second BS is communicatively coupled to a 5G Core network unit.

5. The method of claim 2, wherein the receiving the flight path information further comprises:
   receiving, from a network, the flight path information.

6. The method of claim 2, wherein the receiving the flight path information further comprises:
   receiving, from the second BS, the flight path information.

7. The method of claim 6, wherein the receiving the flight path information further comprises:
   receiving, from the second BS, a handover request message comprising the flight path information.

8. The method of claim 1, wherein:
   the communicating the flight path information associated with the UAV comprises:
   transmitting, to the second BS, the flight path information; and
   the performing the communication handover comprises:
   performing the communication handover of the UAV from the first BS to the second BS.

9. The method of claim 8, wherein the transmitting the flight path information associated with the UAV further comprises:
   transmitting, to the second BS, a handover request message comprising the flight path information.

10. The method of claim 1, wherein the communicating the flight path information further comprises:
    communicating, with the second BS, the flight path information over at least one of an X2 interface or an Xn interface.

11. The method of claim 1, wherein the flight path information comprises partial flight path information associated with the UAV.

12. The method of claim 11, wherein the partial flight path information excludes historic flight path information associated with the UAV.

13. The method of claim 12, wherein the flight path information comprises an estimated time of arrival for one or more of the waypoints to be traveled by the UAV.

14. The method of claim 1, further comprising;
receiving an indicator indicating that updated flight path information is available.

15. The method of claim 1, wherein the communicating the flight path information associated with the UAV comprises:
receiving, from a networked UAV controller, the flight path information.

16. A method of communication performed by a network unit, the method comprising:
receiving an indication of a handover of an unmanned aerial vehicle (UAV) from a first base station (BS) to a second BS;
receiving flight path information associated with the UAV, wherein the flight path information comprises one or more upcoming waypoints to be traveled by the UAV and one or more timestamps associated with the one or more upcoming waypoints; and
transmitting, to the second BS in response to the receiving the flight path information and based on the indication of the handover of the UAV, the flight path information associated with the UAV.

17. The method of claim 16, wherein the receiving the flight path information comprises at least one of:
receiving the flight path information from the UAV;
retrieving the flight path information from a server configured to store the flight path information; or
receiving the flight path information from the first BS.

18. The method of claim 16, wherein the transmitting the flight path information associated with the UAV comprises:
transmitting, to the second BS, the flight path information via an S1 interface application protocol message.

19. The method of claim 16, further comprising;
transmitting, to the second BS, an indicator indicating that updated flight path information is available.

20. The method of claim 16, wherein the network unit comprises at least one of a mobility management entity node or an access and mobility management function node.

21. A first base station (BS) comprising:
a transceiver, a memory, and a processor coupled to the transceiver and the memory, the first base station configured to:
communicate, based on a handover condition, flight path information associated with an unmanned aerial vehicle (UAV), wherein the flight path information comprises one or more upcoming waypoints to be traveled by the UAV and one or more timestamps associated with the one or more upcoming waypoints; and
perform, based on the one or more upcoming waypoints and the one or more timestamps, a communication handover of the UAV between the first BS and a second BS.

22. The first BS of claim 21, wherein the first BS is further configured to:
receive the flight path information; and
perform the communication handover of the UAV from the second BS to the first BS.

23. The first BS of claim 22, wherein the first BS is further configured to at least one of:
receive, from the UAV, the flight path information;
receive, from a network, the flight path information; or
receive, from the second BS, the flight path information.

24. The first BS of claim 21, wherein the first BS is further configured to:
communicate, with the second BS, the flight path information over at least one of an X2 interface or an Xn interface.

25. The first BS of claim 21, wherein the flight path information comprises partial flight path information associated with the UAV.

26. The first BS of claim 25, wherein the partial flight path information excludes historic flight path information associated with the UAV.

27. The first BS of claim 26, wherein the flight path information comprises an estimated time of arrival for one or more of the waypoints to be traveled by the UAV.

28. The first BS of claim 21, wherein the first BS is further configured to:
receive an indicator indicating that updated flight path information is available.

29. A network unit comprising:
a transceiver, a memory, and a processor coupled to the transceiver and the memory, the network unit configured to:
receive an indication of a handover of an unmanned aerial vehicle (UAV) from a first base station (BS) to a second BS;
receive flight path information associated with the UAV, wherein the flight path information comprises one or more upcoming waypoints to be traveled by the UAV and one or more timestamps associated with the one or more upcoming waypoints; and
transmit, to the second BS in response to receiving the flight path information and based on the indication of the handover of the UAV, the flight path information associated with the UAV.

30. The network unit of claim 29, wherein the network unit is configured to perform at least one of:
receive the flight path information from the UAV;
retrieve the flight path information from a server configured to store the flight path information; or
receive the flight path information from the first BS.

* * * * *